(12) United States Patent
Boutinon et al.

(10) Patent No.: US 9,052,253 B2
(45) Date of Patent: Jun. 9, 2015

(54) METHOD OF DETERMINING AT LEAST ONE REFRACTION CHARACTERISTIC OF AN OPHTHALMIC LENS

(75) Inventors: Stephane Boutinon, Charenton le Pont (FR); David Tang, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 218 days.

(21) Appl. No.: 13/884,069

(22) PCT Filed: Nov. 28, 2011

(86) PCT No.: PCT/FR2011/000623
§ 371 (c)(1),
(2), (4) Date: May 8, 2013

(87) PCT Pub. No.: WO2012/072895
PCT Pub. Date: Jun. 7, 2012

(65) Prior Publication Data
US 2013/0235370 A1 Sep. 12, 2013

(30) Foreign Application Priority Data
Dec. 3, 2010 (FR) ...................................... 10 04716

(51) Int. Cl.
*G01M 11/02* (2006.01)

(52) U.S. Cl.
CPC ...... *G01M 11/0228* (2013.01); *G01M 11/0214* (2013.01)

(58) Field of Classification Search
USPC .................... 356/124–127, 239.1–239.8, 515
See application file for complete search history.

(56) References Cited

U.S. PATENT DOCUMENTS

| 4,348,108 A | * | 9/1982 | Shindow | 356/125 |
| 4,395,120 A | * | 7/1983 | Takahashi | 356/125 |

(Continued)

FOREIGN PATENT DOCUMENTS

| DE | 197 12 837 A1 | 10/1997 |
| DE | 197 44 201 A1 | 4/1998 |
| FR | 2 880 118 A1 | 6/2006 |

OTHER PUBLICATIONS

International Search Report, dated Mar. 27, 2012, from corresponding PCT application.

*Primary Examiner* — Kara E Geisel
*Assistant Examiner* — Jarreas C Underwood
(74) *Attorney, Agent, or Firm* — Young & Thompson

(57) ABSTRACT

Method of determining at least one refractive characteristic of an ophthalmic lens, includes:
a) placing the lens on a support having at least one prop element contacting one of the main faces of the lens in a contact zone area smaller than that of the main faces;
b) lighting the lens placed on its support with lighting elements;
c) capturing an image of the prop element of the support lighted by light rays that have passed through the lens, the image being captured in an image capture plane substantially perpendicular to an optical axis of the lens;
d) in the image, identifying the image of the prop element of the support and determining at least one characteristic representative of the geometry of the image of the prop element; and
e) from the characteristic representative of the geometry of the image of the prop element, deducing the looked-for refractive characteristic.

20 Claims, 3 Drawing Sheets

(56) References Cited

U.S. PATENT DOCUMENTS

| | | | |
|---|---|---|---|
| 6,061,123 A * | 5/2000 | Ikezawa et al. | 356/124 |
| 6,844,925 B2 * | 1/2005 | Fukuma et al. | 356/127 |
| 7,280,192 B2 * | 10/2007 | Hayashi et al. | 356/124 |
| 7,301,614 B2 * | 11/2007 | Yanagi et al. | 356/124 |
| 7,742,158 B2 * | 6/2010 | Divo et al. | 356/126 |

\* cited by examiner

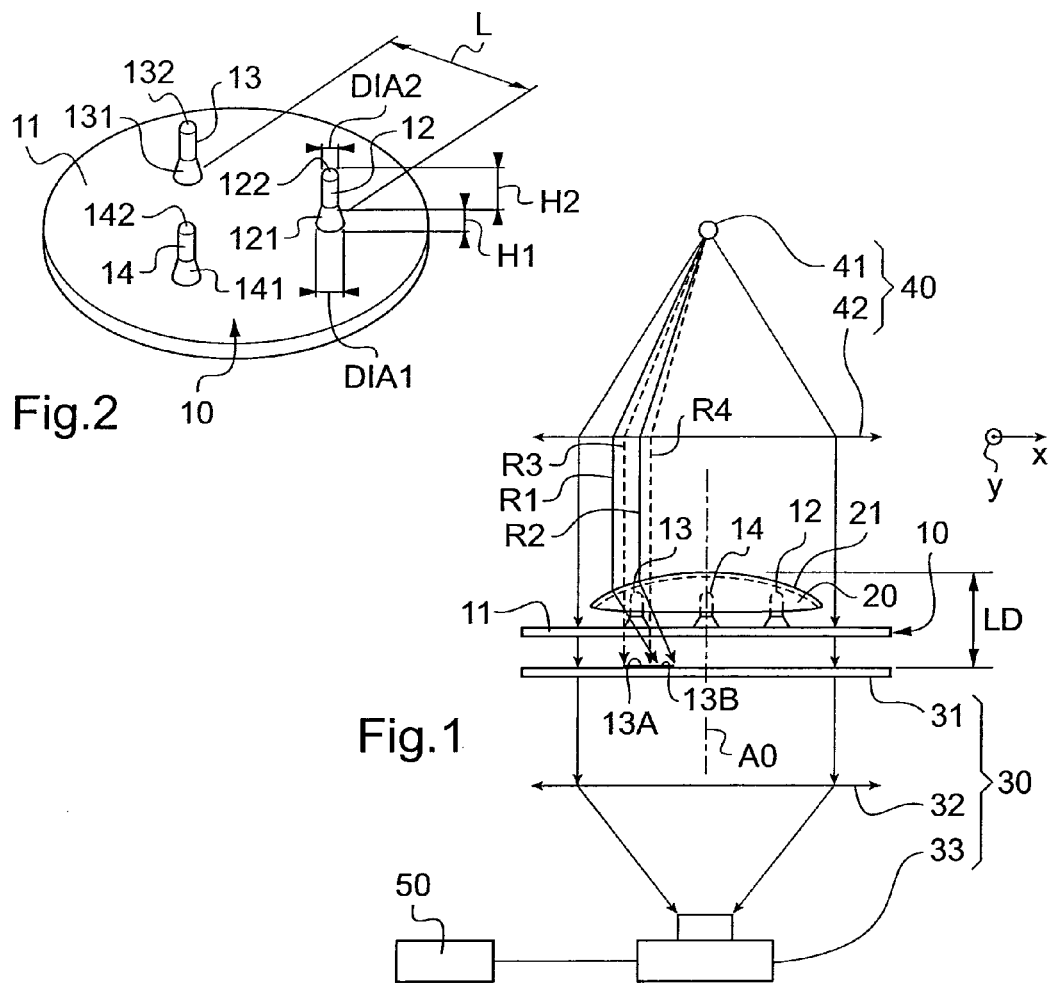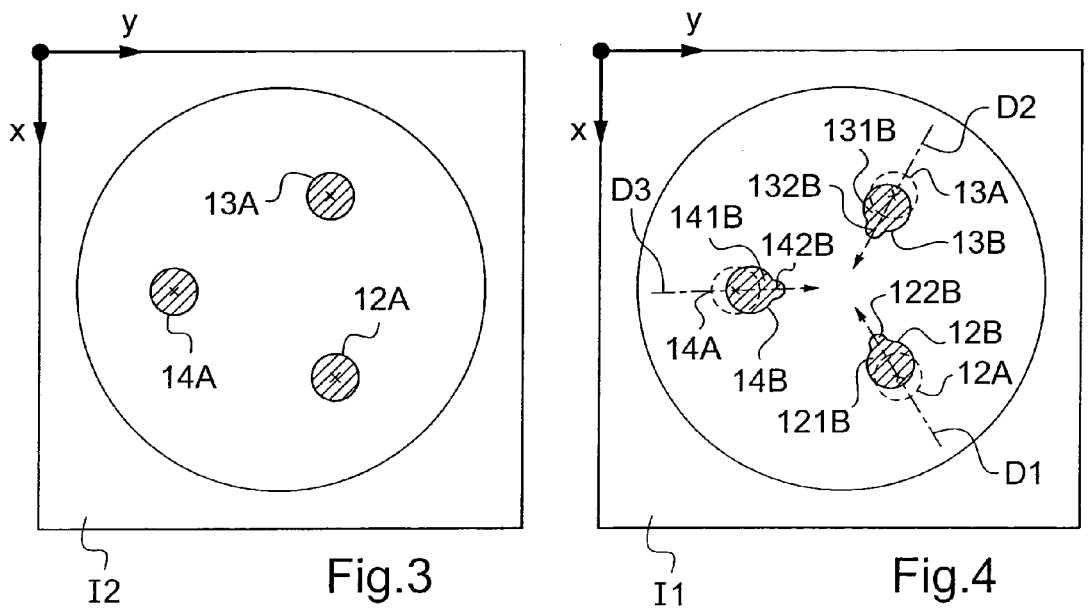

METHOD OF DETERMINING AT LEAST ONE REFRACTION CHARACTERISTIC OF AN OPHTHALMIC LENS

TECHNICAL FIELD TO WHICH THE INVENTION RELATES

The present invention relates to a method of determining at least one refractive characteristic of an ophthalmic lens.

In particular, the invention relates to such a method used for positioning a gripper peg on an ophthalmic lens during a centering and blocking step for the purpose of shaping the lens and mounting it in an eyeglass frame.

TECHNOLOGICAL BACKGROUND

While preparing an ophthalmic lens for mounting in an eyeglass frame, it is often necessary to determine the refractive power and the prismatic deflection of the lens.

To do that, it is common practice to use a plate having patterns of the Hartmann plate type that is interposed between the lens and an image capture device. The lens is lighted by lighting means located on a side of the lens opposite from its side where the image capture device is located.

The patterned plate is transparent and includes a matrix of dots in positions that are predetermined in the absence of a lens. By comparing their positions in the presence of the lens and in the absence of the lens it is possible to determine the spherical power of the lens and its prismatic deflection.

Nevertheless, using such a patterned plate presents drawbacks. In particular, inserting the plate between the lens and the image capture device requires the distance between the lens and the image capture device to be increased, thereby degrading the quality of the image and increasing the effects of distortion associated with the power of the lens.

In addition, including such a dedicated patterned plate increases the cost of the device being used.

Furthermore, the dots on the patterned plate are then displayed in the image together with the lens and the test chart. These dots can disturb the user and prevent accurate adjustment, in particular when the measurement is performed simultaneously with other adjustments that require centering or axis-orientation marks of the lens to be identified, since the dots on the plate can overlie the images of these marks.

It is also known to add markers on the lens for determining a refractive characteristic of a lens arranged on a support and imaged on one side of the support under lighting coming from the opposite side of the support.

Adding paint markers on the surface of the lens can also impede reading centering and/or axis-orientation marks on the lens. The quality of the image is thus degraded. In addition, adding such markers is lengthy and difficult for the user.

It is most advantageous to measure the refractive power and the prismatic deflection of a lens when blocking an ophthalmic lens, as explained in greater detail below.

In order to mount an ophthalmic lens in an eyeglass frame, several steps need to be performed:
the shape of the rim of the frame is determined:
the lens is centered and blocked using a centering and blocking device: a gripper peg, also known as a "block", is fastened on a face of the lens in order to embody a reference position and orientation for trimming the lens and in order to enable the lens to be driven in rotation while it is being trimmed; and
the ophthalmic lens is trimmed with the help of a grinder and it is mounted in the frame.

The centering and blocking device is adapted to determine a point on the surface of the lens that defines the location where the block is to be placed and/or the orientation that the block is to have as a function of the position of a centering and/or axis-orientation mark on the ophthalmic lens and as a function of client parameters (pupillary distance, height from the bottom of the frame, angle of astigmatism, . . . ).

The centering mark on the lens is at the optical center of the lens for a single vision lens, however it is offset from that optical center for lenses of other types: the centering mark is a centering cross for progressive lenses, or the top of a segment having a different power for bifocal lenses.

By way of example, axis-orientation marks may be constituted by horizontal lines.

Most centering and blocking devices that are already known detect the position of the centering mark and/or of the axis-orientation mark of an ophthalmic lens by lighting the lens with a light beam and by picking up the light beam transmitted through the lens. In the image that is obtained, known devices identify the shadows of the centering and/or axis-orientation marks.

In practice, in such a prior art device, the block is placed on the lens by an articulated arm that always performs the same stroke. The block is thus always positioned in the same position in three dimensions and it is necessary to adjust the position of the lens relative to that position in three dimensions in order to ensure that it coincides with the position desired for the block on the lens.

The image of the lens as captured by the camera situated on one side of the lens while the lens is being lighted by the light source located on the other side of the lens is displayed on a screen. The screen also displays a test chart indicating a position for the centering mark that is determined in such a manner that if the centering mark of the lens is aligned with said test chart, the block will be deposited in a position that is suitable for blocking.

The user then needs only to move the lens in such a manner as to cause the position of the centering mark of the lens to coincide on the screen with the position of the test chart.

Such a method is said to be a "projected view" method since the light rays pass through the lens before being detected by the image capture device.

Such devices lead to errors in detecting the position of the optical center or the positions of the centering and/or axis-orientation marks of the ophthalmic lens. Such errors result from the prismatic deflections of the shadows of the marks as induced by the lens itself, where such deflections depend on the spherical, cylindrical, and prismatic optical powers of the ophthalmic lens in the region of the mark in question.

All light rays passing through the lens are deflected, with the exception of those that pass through the optical center of a single-vision lens. Thus, the image of the ophthalmic lens as displayed on the screen and viewed by the user is deformed from reality, which means that the centering mark of the lens is no longer in the three-dimensional position corresponding to the position displayed on the screen.

By aligning the image of the centering mark with the test chart, a systematic error is introduced into the positioning of the block.

This is also true when determining the orientation of the block relative to the image of the axis-orientation mark of the lens.

One solution to that problem consists in determining one or more refractive characteristics of the lens, such as for example its spherical power, and in correcting the positioning of the block on the lens as a function of that characteristic.

Nevertheless, the use of a patterned plate or of paint markers placed on the lens presents the above-mentioned drawbacks: the dots on the patterned plate run the risk of disturbing the user and of preventing accurate adjustment by being superposed on the images of the centering and axis-orientation marks of the lens.

In addition, the quality of the image is degraded, and adding additional elements in the optical equipment can be expensive and difficult for the user.

OBJECT OF THE INVENTION

In order to remedy the above-mentioned drawbacks of the prior art, the present invention proposes a method of determining a refractive characteristic of the lens, which method is easy and inexpensive to perform.

To this end, the invention provides a method of determining at least one refractive characteristic of an ophthalmic lens, the method comprising the steps of:

a) placing the lens on a support having at least one prop element in contact with one of the main faces of the lens in a contact zone of area that is small relative to the area of the main faces of said lens;

b) lighting the lens placed on its support with the help of lighting means;

c) using image capture means to capture an image of the prop element of the support lighted by light rays that come from said lighting means and that have passed through the lens, the image being captured in an image capture plane that is substantially perpendicular to an optical axis of the lens;

d) in said image, identifying the image of said prop element of the support and determining at least one characteristic representative of the geometry of the image of said prop element; and e) from said characteristic representative of the geometry of the image of said prop element, deducing said looked-for refractive characteristic.

This method thus makes it possible to determine a refractive characteristic of the lens, such as its spherical power or its prismatic deflection, either in projected view by capturing an image of the support on the side of the support opposite from the side on which the ophthalmic lens is located, or else in direct view by capturing an image of the support from the same side as the lens.

By using the prop element of the support, of geometrical characteristics that are determined and known, there is no need to add an additional element to the equipment. The image quality is not degraded and there is little disturbance to viewing the marks on the front face of the lens.

In particular, when using projected view image capture, the method of the invention presents the following characteristics:

the lighting means are arranged on one side of said support and:

in step c), an image is captured of the shadow projected by the support as lighted by the light rays that come from said lighting means and that have passed through the lens, the image being captured with the help of said image capture means that are arranged on the side of said support that is opposite from the lighting means;

in step d), the shadow projected by said prop element under lighting by the lighting means is identified in said image and at least one characteristic representative of the position of the projected shadow is determined; and in step e), said looked-for refractive characteristic is deduced at least from said characteristic representative of the position of the shadow projected by said prop element.

Thus, in this method, use is made of the deformation and/or of the shifting of the shadow of the prop element of the lens when the lens is in place on the support in order to determine a refractive characteristic of the lens placed on this support, e.g. the spherical power or the prismatic deflection of the lens.

By means of the method of the invention, it is thus possible to determine a refractive characteristic of the lens, e.g. its spherical power, in a manner that is accurate and easy, without needing to use a pattered plate, and thus without adding an additional optical element to the equipment, in a way that is particularly inexpensive.

The use of this method in a centering and blocking device is particularly advantageous since it enables a refractive characteristic of the lens to be determined without moving the lens away from the image capture device.

It is then possible, either to correct the positions of the centering and/or axis-orientation marks detected by the centering and blocking device and to display the corrected positions, or else to correct the position of the test chart that is displayed so as to ensure that the block is positioned accurately on the lens.

It can be understood that this method may be used in any application in which it is necessary to determine a value for a refractive characteristic of the lens in a manner that is inexpensive and without using a dedicated patterned plate or other additional optical element.

It is preferable to use a support having at least three prop elements, to identify the shadow projected by each prop element of the support in the image, and to determine at least one characteristic representative of the position of the shadow projected by each prop element.

According to other characteristics of the invention that are advantageous, but not limiting:

said looked-for refractive characteristic is one of the following characteristics: the optical center; the spherical power; the cylindrical power and the orientation of the axis of the power cylinder; and the prismatic power and the orientation of the edge of the power prism;

in step d), the following substeps are performed:
d1) searching the image captured in step c) for a partial or total estimated outline of the shadow projected by the prop element of the support;
d2) determining a position of a geometrical center of said estimated outline of the shadow projected by the prop element of the support; and
d3) comparing the position of the geometrical center of the estimated outline as determined in step d2) with a reference position for a geometrical center of the shadow projected by the prop element in the absence of a lens, and deducing therefrom the shift of the shadow projected by the prop element of the support between said reference position and the position determined in step d2);

in step e), the looked-for refractive characteristic is deduced from this shift;

in a preliminary calibration step preceding the performance of step d3), said reference position of the geometrical center of the shadow projected by the prop element is determined by performing the following steps:
lighting said support with the help of said lighting means and in the absence of an ophthalmic lens;

capturing an image of the shadow projected by the support lighted by the light rays from said lighting means with the help of said image capture means, the image being captured in said image capture plane, which is substantially perpendicular to the optical axis of the lens when the lens is placed on said support; and identifying in said image the shadow projected by said prop element of the support under lighting by the lighting means, and determining the reference position of its geometrical center;

in step e), the following substeps are performed:
   e1) determining a corrected outline of the shadow projected by the prop element of the support from the outline estimated in step d1) by eliminating from the estimated outline a set of points situated around the shift direction as determined in step d3);
   e2) modeling the corrected outline of the shadow projected by the prop element of the support with a model outline;
   e3) determining the position of the geometrical center of the model outline; and
   e4) deducing the looked-for refractive characteristic from the position of the geometrical center of the model outline determined in step e3) and from the reference position of the geometrical center of the shadow projected by the prop element in the absence of a lens;

said set of points eliminated from the outline estimated in step e1) intercepts an angular sector of angle lying in the range 0 to 180 degrees;

in step c), a gray level digital image is captured in which each pixel presents a determined brightness value; and in step d1), a binarization step is performed as follows:
   allocating a first brightness value to the pixels of said image that initially presented a brightness value less than a brightness threshold value;
   allocating a second brightness value to the pixels that initially presented a brightness value greater than said threshold brightness value; and then
   searching for the pixels where said brightness value changes from said first value to said second value.

The invention also provides a method of centering a gripper block on an ophthalmic lens, the method comprising the following steps:
   determining the position of the optical center of said lens according to the above-described method; and
   placing the gripper block on the lens in a position that coincides with or that depends on said optical center.

When image capture is performed in direct view, the method of the invention comprises the following steps:
   said lighting means are located on one side of said support;
   in step c), an image is captured of the support as lighted by light rays from said lighting means that have passed through said lens, the image being captured with the help of said image capture means that are located on the same side of said support as said lighting means;
   in step d), identifying the image of the prop element of the support in said image and determining at least one characteristic representative of a transverse dimension of the image of said prop element; and
   in step e), deducing said looked-for refractive characteristic at least from said characteristic representative of a transverse dimension of the image of said prop element.

The invention also provides a method of centering an ophthalmic lens relative to a reference mark, the lens including a centering mark for being put into correspondence with said reference mark, the method comprising the following steps:
   i) using the above-described method of determining at least one refractive characteristic of an ophthalmic lens to determine the spherical power of the lens;
   j) lighting the lens placed on its support with the help of said lighting means located on one side of said support, and, in said image capture plane, capturing an image of the shadow projected by the centering mark of the lens when lighted by the lighting means;
   k) displaying on a display screen firstly the shadow of the reference mark of the lens, and secondly a virtual centering target corresponding to the desired position for the centering mark relative to said reference mark;
   l) from the spherical power of the lens as determined in step i), deducing a corrected display position for the virtual centering target and/or for the image of the shadow projected by the centering mark; and
   m) moving the ophthalmic lens in such a manner as to cause the corrected position of the shadow of the centering mark of the lens to coincide with the position of the virtual centering target.

Finally, the invention provides a device for performing the above-described method of determining at least one refractive characteristic of an ophthalmic lens, the device comprising:
   a support adapted to receive an ophthalmic lens, the support having at least one prop element in contact with one of the main faces of the lens in a contact zone of area that is small relative to the area of the main faces of said lens;
   lighting means;
   image capture means; and
   an image processor device adapted to respond to an image captured by said image capture means in a plane substantially perpendicular to an optical axis of the lens to identify the shadow projected by said prop element of the support, to determine at least one characteristic representative of the position of the projected shadow, and, from said characteristic representative of the position of the shadow projected by said prop element, to deduce said looked-for refractive characteristic.

In practice, the support of the device has at least three distinct prop elements.

According to other advantageous and non-limiting characteristics of the device of the invention:
   said support is removable;
   said support includes a transparent stand plate on which the prop element stands, the prop element having at least one portion that is opaque; and
   said prop element comprises a base extended by a tip of width that is smaller than the width of said base.

DETAILED DESCRIPTION OF AN EMBODIMENT

The following description given by way of non-limiting example and with reference to the drawings make it possible to understand what the invention consists in and how it can be reduced to practice.

In the accompanying drawings:

FIG. 1 is an optical diagram of a projected view device enabling the method of the invention to be implemented;

FIG. 2 is a perspective view of the lens support in the FIG. 1 device;

FIGS. 3 and 4 are diagrammatic views of the images of shadows of the prop elements of the lens as viewed in the absence (FIG. 3) or in the presence (FIG. 4) of the lens;

Elements that are identical and shown in more than one of the figures are identified by the same references.

FIGS. 1 to 8 are diagrams showing two embodiments of a device in accordance with the invention enabling at least one refractive characteristic of an ophthalmic lens 20 to be determined.

The lens may be single vision, bifocal, trifocal, or indeed an ophthalmic lens with progressive addition of power.

The looked-for refractive characteristic is one of the following characteristics: the optical center; the spherical power; the cylindrical power and the orientation of the axis of the power cylinder; and the prismatic power and the orientation of the edge of the power prism.

Figure 8:
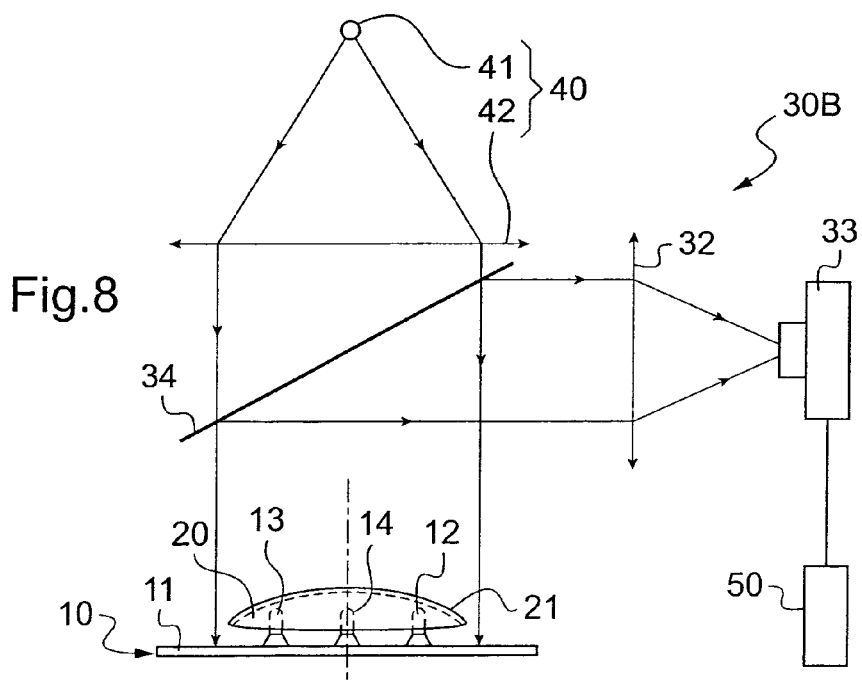
FIG. 8 is an optical diagram of a direct view device enabling the method of the invention to be implemented.

For this purpose, and as shown diagrammatically in FIGS. 1 and 8, the device advantageously comprises:
  a support 10 adapted to receive said ophthalmic lens 20, the support including at least one prop element 12, 13, 14 in contact with one of the main faces of the ophthalmic lens 20 in a contact zone of area that is small compared with the area of the main faces of the lens;
  lighting means 40;
  image capture means 30, 30B; and
  image processor means 50 adapted to identify the image of the support from an image captured by said image capture means in an image capture plane substantially perpendicular to an optical axis AO of the lens, to determine at least one characteristic representative of the geometry of the prop element of the support, and to deduce the looked-for refractive characteristic from this representative characteristic.

The support 10 preferably includes at least two prop elements 12, 13, 14.

More particularly and as shown in the figures, the support 10 has three distinct prop elements 12, 13, 14, each of which is in contact with the rear main face of the ophthalmic lens 20 in a contact zone of area that is small relative to the area of the rear main face.

The zones where the prop elements 12, 13, 14 make contact with the ophthalmic lens 20 are preferably completely separate from one another.

As can be seen in particular in FIGS. 1 to 4, the contact zones between the prop elements 12, 13, 14 and the ophthalmic lens 20 are distinct and spaced apart from one another.

In a method of determining at least one refractive characteristic of an ophthalmic lens 20 in accordance with the invention, the following steps are performed:
  a) placing the lens 20 on the support 10;
  b) lighting the lens 20 placed on its support 10 with the help of lighting means 40;
  c) using image capture means 30 to capture an image of the support 10 lighted by rays that come from said lighting means that have passed through said lens 20, the image being captured in an image capture plane that is substantially perpendicular to an optical axis of the lens 20;
  d) in the image, identifying the image of at least one prop element 12, 13, 14 of the support 10 and determining at least one characteristic representative of the geometry of said image of the prop element of the support 10; and
  e) from this characteristic representative of the geometry of the image of the prop element of the support 10 deducing said looked-for refractive characteristic.

More precisely, and in the projected view embodiment shown in accompanying FIGS. 1 to 7:
  the lighting means 40 are arranged on one side of the support 10;
  said image capture means 30 are arranged on the side of said support 10 that is opposite from said lighting means 40; and
  the image processor means 50 are adapted to identify in a captured image the projected shadow of at least one prop element 12, 13, 14 of the support 10, to determine at least one characteristic representative of its position, and to deduce said looked-for refractive characteristic from this characteristic representative of the position of the projected shadow of the prop elements 12, 13, 14.

Preferably, the image processor means 50 are adapted to identify in a captured image the projected shadows of each of the prop elements 12, 13, 14 of the support 10, to determine at least one characteristic representative of the position of each of them, and to deduce said looked-for refractive characteristic from said characteristic representative of the positions of the projected shadows of each of the prop elements 12, 13, 14.

In this example, the support 10 has a transparent stand plate 11 on which said prop elements 12, 13, 14 stand.

As shown in FIG. 2, each prop element 12, 13, 14 has a base 121, 131, 141 extended by a tip 122, 132, 142 of width that is smaller than the width of said base 121, 131, 141.

Each prop element 12, 13, 14 has at least one opaque portion, preferably its base 121, 131, 141. In this example, the prop elements 12, 13, 14 are completely opaque.

By way of example, the base 121, 131, 141 of each prop element 12, 13, 14 may be made out of a plastics material and the tip 122, 132, 142 of each prop element 12, 13, 14 may be made out of a plastics material presenting stiffness that is less than that of the material used for making the base 121, 131, 141 of the prop element. In addition, the free end of the tip of each prop element 12, 13, 14 is preferably of rounded shape.

In a variant, the tip of each prop element made be made of a plastics material that is transparent.

The above-described embodiment of the prop elements serve to enable the ophthalmic lens 20 to be received effectively without being damaged.

The prop elements 12, 13, 14 are in contact with the lens in three contact zones of area that is small compared with the area of the main faces of the lens. The contact zone of each prop element with the rear face of the lens typically presents an area of less than 10 percent of the area of the rear face of the lens. In other words, the diameter of the tips 122, 132, 142 of the prop elements is much less than the diameter of the lens, preferably less than one-fifth the diameter of the lens.

The stand plate 11 is plane, e.g. being made of a transparent plastics material. The base 121, 131, 141 of each prop element 12, 13, 14 is fitted to said stand plate 11, e.g. by adhesive or by screw-fastening on said stand plate 11.

Advantageously, the support 10 is removable, thus making it possible to use interchangeable supports presenting prop elements of different sizes and spaced apart with different spacings as a function of the ophthalmic lens 20 that is to be received.

In the example shown in the figures, the support 10 is adapted to receive ophthalmic lenses of standard size, of power that is less than or equal to 8 diopters, and not trimmed.

The prop elements 12, 13, 14 are then spaced part in pairs by a distance L equal to 35 millimeters (FIG. 2) and they present a total height H2 of 15 millimeters. The base 121, 131, 141 of each of them is frustoconical in shape having a diameter DIA1 on the stand plate 11 that is equal to 7 millimeters and a height H1 that is equal to 5 millimeters.

The tip 122, 132, 142 presents a shape that is cylindrical with a diameter DIA2 equal to 5 millimeters (FIG. 2).

Other supports, e.g. adapted to receive ophthalmic lenses of greater camber and of larger diameter may include prop elements of similar shape that are spaced apart by 45 millimeters and that present a total height equal to 25 millimeters.

In contrast, in order to receive an ophthalmic lens that is to be re-sized, i.e. a lens that has already been trimmed and is already of smaller size, a support should be used having prop elements that are spaced apart by a distance of less than 35 millimeters, and that present a total height that is less than or equal to 15 millimeters.

In the example shown in the figures, the lighting means 40 comprise a light source 41 that emits a diverging light beam towards a converging lens 42. The light source 41 is placed at the focus of the converging lens 42 so that the light beam emerging from the lighting means 40 towards the ophthalmic lens 20 that is received on the support 10 is parallel.

Alternatively, it is possible to envisage lighting means comprising a light source and a reflection system including a mirror inclined at 45° and a converging lens adapted to use a parallel light beam to light the ophthalmic lens placed on the support.

As shown in FIG. 1, light rays R1, R2 drawn with continuous lines and coming from the lighting means 40 are deflected on passing through the lens 20 and they light the prop elements 12, 13, 14 of the support 10. These deflected light rays R1, R2 project shadows 12B, 13B, 14B from each of the prop elements 12, 13, 14. FIG. 1 shows more particularly the shadow 13B of the prop element 13.

The light rays R3, R4 shown in dashed lines in FIG. 1 show the paths of light rays that project shadows 12A, 13A, 14A of the prop elements 12, 13, 14 when the lens 20 is not placed on the support 10. These light rays R3, R4 are not deflected. FIG. 1 shows more particularly the shadow 13A of the prop element 13.

The image capture means 30 in this example comprise a digital camera 33, another converging lens 32, and a translucent screen 31.

In a variant, it is possible to replace the digital camera 33 with any appliance enabling a digital image to be captured.

The converging lens 32 is positioned in such a manner as to cause the light rays that have passed through the ophthalmic lens to converge on the sensor of the digital camera 33 so that the image recorded by the camera covers the entire ophthalmic lens.

It is also possible to envisage using an optical system for reflecting the light beam transmitted by the ophthalmic lens and including a mirror inclined at 45° to enable the digital camera to act via the optical angular reflection performed by the inclined mirror to pick up the shadows projected onto the translucent screen.

The translucent screen 31 forms a surface onto which the shadows of the prop elements 12, 13, 14 of the support 10 and of the lens 20 are projected in order to enable them to be viewed.

The support 10, the translucent screen 31, and the sensor of the digital camera 33 preferably lie in planes that are perpendicular to the optical axis AO of the lens 20. The image capture plane of the digital camera 33 is thus substantially parallel to the translucent screen 31 and to the stand 11 of the support 10.

In addition, the support 10 and the translucent screen 31 are preferably spaced apart by a distance that is not less than 0.5 centimeters.

In a variant, it is possible to envisage that the shadows of the lens and of the support are projected directly onto the sensor of the digital camera, without a translucent screen.

It is also possible to envisage the stand of the support forming a translucent surface suitable for viewing shadows that have been projected thereon.

Under such circumstances, the portion of each prop element in contact with the translucent surface does not present a projected shadow, and it is the shadow projected by another portion of the prop element that is used, e.g. the shadow of the free end of said prop element or of an intermediate portion situated between the free end and the portion in contact with said translucent surface.

The image processor means 50 (FIG. 1) are suitable for processing the signal obtained at the output from the digital camera 33 by performing steps that are explained in greater detail below.

In the method of the invention, in order to determine the looked-for refractive characteristic of the lens, the user acts in a step a) to place the lens 20 on the three prop elements 12, 13, 14 of the support 10.

Then, in a step b), the user lights the lens 20 placed on its support 10 with the help of the lighting means 40.

Thereafter, in a step c), the user triggers the capture of an image of the shadow projected by the lens 20 and by the support 10 as lighted by the lighting means 40, the image being captured in an image capture plane that is substantially perpendicular to the optical axis AO of the lens.

FIG. 4 is a diagram of an image I1 of the shadow of the support 10 projected on the translucent screen 31 as captured in step c) in the presence of the lens 20 placed on the support 10.

The shadows 12B, 13B, 14B of the prop elements 12, 13, 14 are shaded.

By way of comparison, FIG. 3 is a diagram showing an image I2 of the support 10 as captured in the absence of the lens 20. The shadows 12A, 13A, 14A of the prop elements 12, 13, 14 are shaded.

As shown in FIG. 3, in the absence of a lens, the shadows 12A, 13A, 14A of the prop elements 12, 13, 14 are circular, and of the same diameter as the bases 121, 131, 141 of the prop elements and they are arranged in register with those prop elements, i.e. they are spaced apart by the same distance as the prop elements themselves.

As shown in FIG. 4, in the presence of the lens 20, the shadows 12B, 13B, 14B of the prop elements 12, 13, 14 of the lens are moved and deformed because of the deflection of the light rays. FIG. 4 uses dashed lines to show the outlines of the shadows 12A, 13A, 14A of the prop elements 12, 13, 14 in the absence of the lens 20, by way of comparison.

In remarkable manner, in a step d) and from the image I1 captured in the presence of the lens 20, the image processor means 50 identify the projected shadows 12B, 13B, 14B of said prop elements 12, 13, 14 of the support 10 under lighting from the lighting means 40, and for each of the shadows 12B, 13B, 14B, they determine at least one characteristic representative of the position of the shadows 12B, 13B, 14B on the captured image I1.

In practice, this step d) is performed by performing the substeps that are described below. These substeps are illustrated more particularly in FIGS. 5A to 5D for the shadow 13B of the prop element 13 in the presence of the lens 20.

Figures 5A, 5B, 5C, 5D:
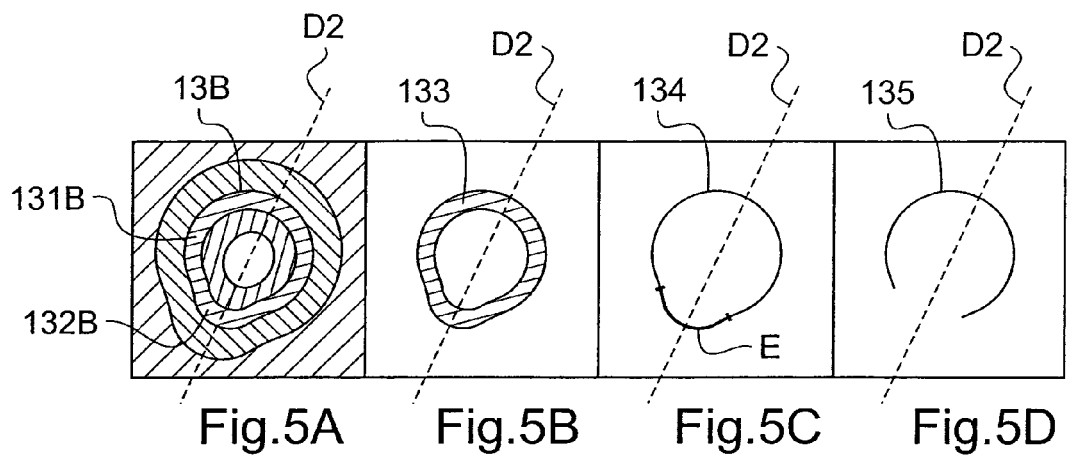
FIG. 5A is a detail view of the shadow of one of the prop elements of the FIG. 4 lens, in which the shading represents different gray levels.
FIGS. 5B to 5D show the outline of the FIG. 5A shadow at different steps of the image processing shown in FIG. 5A.
Figure 7:
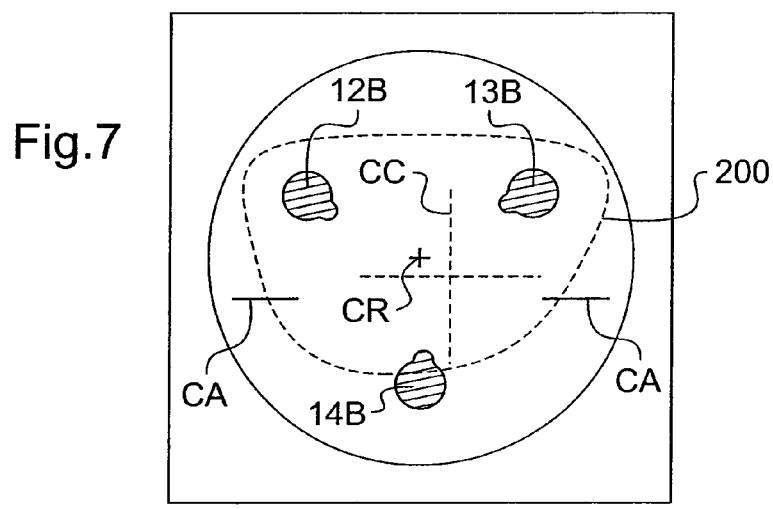
FIG. 7 is a diagrammatic view of the image displayed on the display screen of the FIG. 6 centering and blocking device.

In a substep d1), the image processor means 50 perform a search in the image captured in step c), as shown enlarged in FIG. 5A, for a partial or total estimated outline 134 of the shadow 12B, 13B, 14B as projected by each prop element 12, 13, 14 of the support 10, as shown in FIG. 5B.

The image I1 captured in step c) is more precisely a gray-scale digital image. In FIG. 5A, different levels of gray are represented diagrammatically by different shading.

In the digital image I1, each pixel presents a determined brightness value lying for example in the range 0 to 255, with level 0 corresponding to minimum brightness, i.e. to a black color, and level 255 corresponding to maximum brightness, i.e. a white color.

Under such conditions, in step d1), the image processor means 50 perform a step of measuring gray level transitions, and a binarization step during which a first brightness value is allocated to the pixels of said image I1 that initially presents a brightness value that is less than a brightness threshold value, and a second brightness value is allocated to the pixels that initially presented a brightness value greater than said brightness threshold value.

The brightness threshold value is predetermined during a calibration step. This threshold value may be determined as a function of a typical gray level of the image, e.g. as a function of the mean gray level in a defined zone around the image of each stud.

For example, the value 0 is given to pixels of brightness less than 200 and the value 255 is given to pixels of brightness greater than 200.

This binarization step serves to determine a first set of pixels defining a coarse first outline 133 of the shadow 13B of each prop element 13. A black and white image is obtained in which the coarse outline 133 of each prop element 12, 13, 14 appears, in the presently-described embodiment, in white on a black background. This coarse outline 133 is shown shaded in FIG. 5B.

It is also possible to predetermine regions of the image in which the shadows 12B, 13B, 14B of the prop elements are contained and to perform the binarization step and the subsequent steps only in those predetermined regions of the image.

The image processor means 50 then search for the pixels of the first set of pixels defining said coarse outline 133 at which said brightness value changes from said first value to said second value. This corresponds to searching for a maximum gradient on passing to an adjacent pixel.

In practice, a center of gravity or "barycenter" of this first set of pixels is determined, and then using this center of gravity, and proceeding in all directions thereabout, the pixels of said first set that present a maximum brightness gradient, i.e. an intensity variation of maximum amplitude on passing from that pixel to an adjacent pixel, are identified.

The pixels as selected in this way form a second set of pixels corresponding to said estimated outline 134 of the shadow 13B of the prop element 13 under consideration, as shown in FIG. 5C.

As shown in FIG. 5C, this estimated outline 134 is not circular. The projections of the shadows of the prop elements 12, 13, 14 by the light rays as deflected by the lens 20 are shifted and deformed relative to the shadows projected by the light rays that have not been deflected by the lens.

More precisely, the shadows 12B, 13B, 14B of the prop elements 12, 13, 14 correspond to superpositions of the shadows 121A, 131A, 141A of the bases 121, 131, 141 of each of the prop elements 12, 13, 14 and of the shadows 122B, 132B, 142B of the ends of the tips 122, 132, 142 of the corresponding prop elements 12, 13, 14 (FIGS. 4 and 5A).

The shadows 121A, 131A, 141A of the bases 121, 131, 141 of the prop elements 12, 13, 14 are then elliptical in shape, and the ends of the shadows 122B, 132B, 142B of the tips 122, 132, 142 of the prop elements 12, 13, 14 project from the shadows of the bases 121, 131, 141 (FIG. 5A).

Nevertheless, in a substep d2), it is possible to determine a first approximate position for the shadow 12B, 13B, 14B of each prop element 12, 13, 14, this first position being determined as the position of a geometrical center of the estimated outline 134 of the projected shadow 13B of each prop element of the support.

For this purpose, the image processor means 50 determine the position of the ellipse or of the circle that provides the best model of the estimated outline 134 for each shadow 12B, 13B, 14B. The position of the geometrical center of the estimated outline 134 is then determined as being the position of the geometrical center of that ellipse or circle.

In practice, said first position of the shadow 12B, 13B, 14B of each prop element is determined by the coordinates (X112, Y112), (X113, Y113), (X114, Y114) of said geometrical center of the ellipse or of the circle in a reference frame (X,Y) attached to the image capture plane. By way of example, these coordinates are expressed in hundredths of a pixel along an X axis and along a Y axis perpendicular to the X axis, with the origin being taken as a point of the image capture plane that corresponds to one of the corners of the captured image.

Thereafter, the image processor means 50 perform a step d3) on each prop element 12, 13, 14 of the support to compare the position (X112, Y112), (X113, Y113), (X114, Y114) of the geometrical center of the estimated outline 134 determined in step d2) with a reference position (X012, Y012), (X013, Y013), (X014, Y014) of a geometrical center of the projected shadow of the same prop element 12, 13, 14 in the absence of a lens.

The image processor means 50 then deduce therefrom the shift of the shadow 12B, 13B, 14B projected by each prop element 12, 13, 14 of the support 10 between this reference position and the first position as determined in step d2).

This reference position (X012, Y012), (X013, Y013), (X014, Y014) is determined in the same reference frame (X,Y) as the first position (X112, Y112), (X113, Y113), (X114, Y114) as determined in step d2), during a preliminary step prior to performing the method of the invention.

In this preliminary step, the user triggers the capture of the image I2 of the support 10 in the absence of the lens 20 (FIG. 3). From the image I2 captured in this way, the image processor means 50 identify the estimated outlines of the shadows 12A, 13A, 14A of the prop elements 12, 13, 14 of the support 10, in the same manner as that described above when processing the image as captured in the presence of the lens 20.

Thereafter, the center of the ellipse or of the circle that provides the best model of the set of pixels constituting the outline as determined in this way is stored in memory as the reference position of the shadows 12A, 13A, 14A of each prop element.

Thus, in step d3), by comparing the first position (X112, Y112), (X113, Y113), (X114, Y114) of the shadow 12B, 13B, 14B of each prop element with the corresponding reference position (X012, Y012), (X013, Y013), (X014, Y014), the image processor means 50 determine the coordinates (T1X, T1Y), (T2X, T2Y), and (T3X, T3Y) of a vector T1, T2, T3 representing the shift of the shadow of each prop element 12, 13, 14 in the reference frame (X,Y) under consideration, where:

T1X=X112-X012;
T1Y=Y112-Y012;
T2X=X113-X013;
T2Y=Y113-Y013;
T3X=X114-X014; and
T3Y=Y114-Y014.

The image processor means 50 thus determine the direction D1, D2, D3 of the shift, its sign, and the length of this shift (FIGS. 4 and 5A to 5D).

In the method in accordance with the invention, in a step e), the image processor means 50 deduce said looked-for refractive characteristic from at least one of the characteristics representative of the positions of the projected shadows 12B, 13B, 14B as determined in step d).

More precisely, in this example in step e), the image processor means 50 deduce the looked-for refractive characteristic from the shift T of at least one of the prop elements of the support as determined in step d3).

For this purpose, in a substep e1), the image processor means 50 determine a corrected outline 135 (FIG. 5D) for the shadow 12B, 13B, 14B projected by each prop element 12, 13, 14 of the support 10 in the presence of the lens 20 on the basis of the estimated outline 134 as determined in step d1), by eliminating from the estimated outline 134 a set E of points situated around the direction D1, D2, D3 of the shift determined in step d3) (FIG. 5C).

This set of points E covers at least the points of the estimated outline 134 that correspond to the end of the shadow 122B, 132B, 142B of the tip 122, 132, 142 of the prop element 12, 13, 14. The shadow 122B, 132B, 142B of the tip of the prop element extends along the shift direction D1, D2, D3.

By way of example, provision may be made for the set of eliminated points to comprise all of the points of the estimated outline 134 that are situated in an angular space occupying an angle lying in the range 0 to 180 degrees, e.g. equal to 40 degrees, and centered on the shift direction D1, D2, D3 (FIGS. 5C and 5D).

The corrected outline 135 as obtained for the prop element 13 is shown in FIG. 5D.

If the length of the shift of the shadow 12B, 13B, 14B of the prop element 12, 13, 14 is less than one pixel, provision may also be made to eliminate no points from the estimated outline 134. This applies to ophthalmic lenses of low powers.

In the general case, it is then possible to determine a second position (X212, Y212), (X213, Y213), (X214, Y214) of the shadow 12B, 13B, 14B on the basis of the corrected outline 135, which position is more accurate than the first position (X112, Y112), (X113, Y113), (X114, Y114) as determined in step d2) since the error in determining the ellipse or the circle that provides the best model of the estimated outline 134 and due to the presence of the end of the shadow 122B, 132B, 142B of the tip 122, 132, 142 of the prop element 12, 13, 14 is now eliminated.

Thus, in a step e2), the image processor means 50 model the corrected outline 135 of the shadow 12B, 13B, 14B projected by each prop element 12, 13, 14 of the support by means of a model outline. For this purpose, they determine the ellipse or the circle that provides the best model of the corrected outline 135.

In a step e3), they determine the center of this circular or elliptical model outline and store the position of this center in memory, which position is identified with the second position (X212, Y212), (X213, Y213), (X214, Y214) of the corresponding shadow 12B, 13B, 14B.

In a step e4), the image processor means 50 use this second position (X212, Y212), (X213, Y213), (X214, Y214) of the shadow 12B, 13B, 14B as determined in step e3) and the reference position (X012, Y012), (X013, Y013), (X014, Y014) of the shadow 12A, 13A, 14A of the same prop element 12, 13, 14 as determined during the preliminary step to deduce the looked-for refractive characteristic.

For this purpose, the image processor means 50 calculate the inclinations (PX1, PY1), (PX2, PY2), (PX3, PY3) of the deflected light rays R1, R2 coming from the lens 20 and corresponding to the positions of the shadows of each of the prop elements.

These inclinations are determined along directions parallel to the axes X and Y of the image capture reference frame as a function of the shifts of the shadows of the prop elements 12, 13, 14 between their reference positions and their determined second positions.

More precisely, in this example using the following notation: S is the spherical power of the lens; C is the cylinder of the lens; a is the angle of inclination of the cylinder axis of the lens; and PX and PY are the prisms of the lens along the axes X and Y of the reference frame attached to the image capture plane; the method of the invention makes it possible to determine the refractive characteristics PX, PY, and a of the lens and also its characteristics S and C, using the following relationships:

$$S=(\tfrac{1}{2})*(S+C*\cos(2*a))+(\tfrac{1}{2})*(S-C*\cos(2*a))$$

and $$C=\mathrm{sqrt}\{((\tfrac{1}{2})*(S+C*\cos(2*a))-(\tfrac{1}{2})*(S-C*\cos(2*a)))^2+(C*\sin(2*a))^2\}$$

where sqrt is the square root function.

The image processor means 50 can then also determine the coordinates (XCO, YCO) of the optical center of the lens 20 as the coordinates of the points through which the light rays are not deflected, using the following relationships:

$$XCO=-\{PX+C*\sin(2*a)*YCO\}/\{S+C*\cos(2*a)\}$$

and $$YCO=\{(C*\sin(2*a)*PX-PY*(S+C*\cos(2*a)))\}/\{(S-C*\cos(2*a))*(S+C*\cos(2*a))-(C*\sin(2*a))^2\}$$

The method of the invention thus makes it possible to determine all of the above-mentioned refractive characteristics without using specific optical elements such as patterned plates.

The spherical power S can be determined by this method to within about 0.5 diopters, for example.

Figure 6:
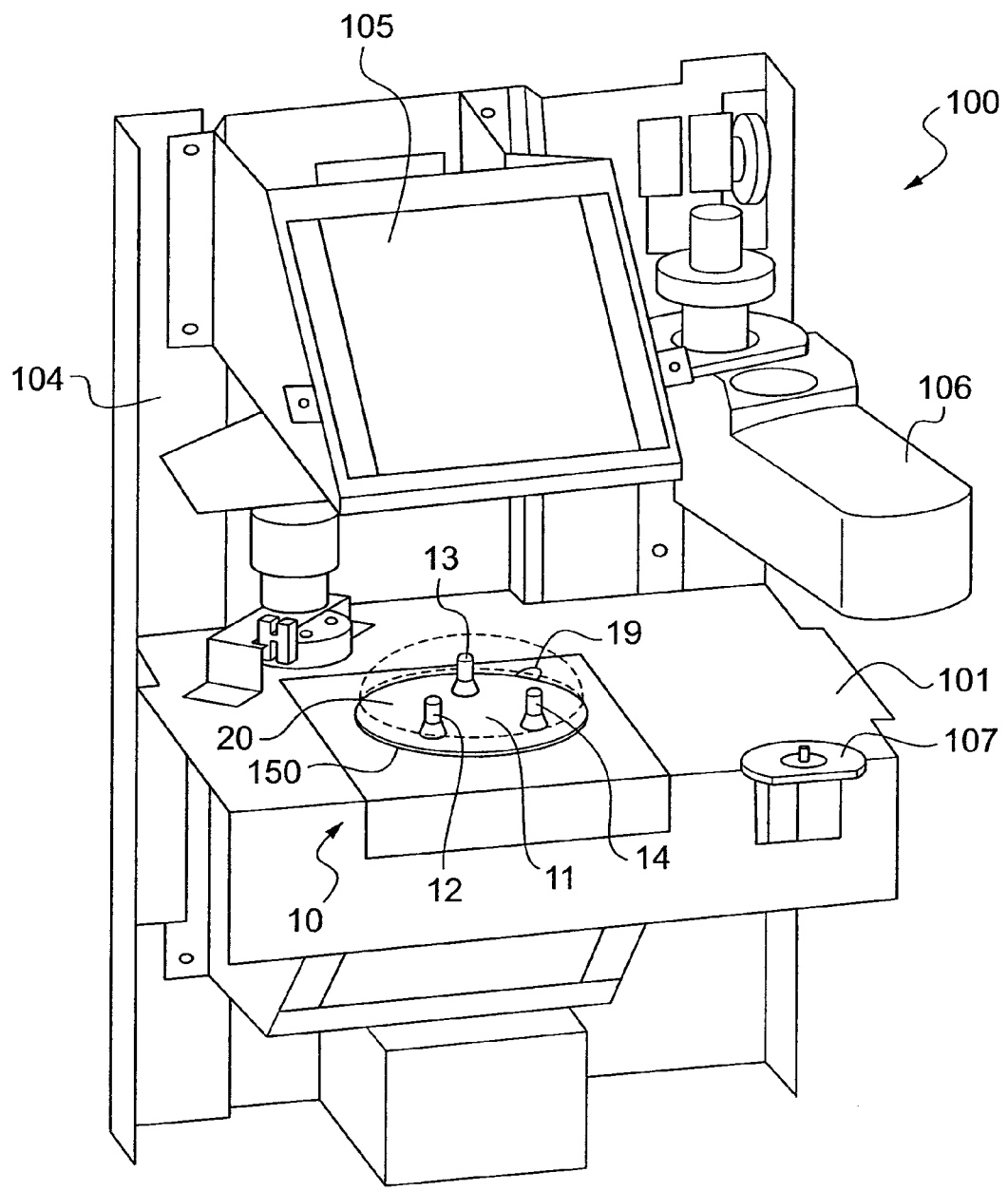
FIG. 6 is an overall view of a centering and blocking device using the method of the invention.

FIG. 6 is a diagram of an embodiment of a centering and blocking device 100 adapted to perform the method of the invention and comprising a work desk 101 carrying the support 10 for the ophthalmic lens 20.

The centering and blocking device 100 also includes a display screen 105 fastened to the structure 104 in such a manner as to be oriented so as to be visible to the user working on the work desk 101.

As shown in FIG. 6, the centering and blocking device 100 also has a positioning arm 106 that is optionally automatic, that is connected to the structure 104, and that is adapted with the help of a clamp to take hold of a grip peg, also referred to as a "block", that is arranged on a container 107, and to place it an unvarying location in three dimensions that is put into correspondence with a point determined by calculation on the front face of said ophthalmic lens placed on the support 10.

For this purpose, the centering and blocking device 100 is adapted to determine the point on the surface of the lens 20 on which the block is to be placed and/or the orientation of the block as a function of the position of a centering and/or an axis-orientation mark of the ophthalmic lens on the basis of client parameters (pupillary distance, height from the bottom of the frame, angle of astigmatism, . . . ).

For this purpose, the centering and blocking device 100 is adapted to detect the positions of said centering and/or axis-orientation marks of the lens 20.

The centering mark of the lens is at the optical center of the lens for a single-vision lens, but it is offset from that optical center for other types of lens: the centering mark is a centering cross for progressive lenses, or the top of a segment of different power for bifocal lenses.

By way of example, axis-orientation marks may be constituted by horizontal lines.

Using the method of the invention in a centering and blocking device 100 of the kind shown in FIG. 6 is particularly advantageous since it enables a refractive characteristic such as the spherical power of the lens to be determined without making use of a patterned plate, thereby making it possible to position the block more accurately on the lens.

For this purpose, the centering and blocking device 100 advantageously has a device similar to that shown diagrammatically in FIG. 1 that is suitable for implementing the method of the invention, namely:
  the support 10 for the ophthalmic lens 20 as described above; and
  on opposite sides of the support, firstly the lighting means 40 for lighting the ophthalmic lens 20 installed on said support 10, and secondly means for acquiring and analyzing the light transmitted through said ophthalmic lens 20 and including the image capture device 30 and the image processor means 50.

In this example, the support 10 is received in a reception housing 150.

In the example shown in the figures, a recess 19 is provided in the housing 150 at the side of the support 10 in order to enable the user to slide a finger between the edge of the housing 150 and the stand 11 of the support 10 so as to make it easy to lift the support 10. This ensures that the support is easily interchangeable.

In another variant, the support may be lifted by the prop elements. A recess similar to the above-described recess 19 may then co-operate with a keying portion of the support in order to ensure that it is accurately positioned.

The steps of the method of the invention for blocking the lenses are as follows.

Step i)
The user places the lens 20 on the support 10 that is initially in its housing 150, centered relative to the image capture device 30 in order to enable an image to be captured that covers the entire lens.

Thereafter, user performs the steps of the method for determining a refractive characteristic of the lens, as described above.

By means of this method, the spherical power of the lens, the cylinder of the lens, the angle of inclination of the cylinder axis of the lens, and the prism of the lens relative to the axes X and Y of the image capture reference frame are determined.

Step j)
The lens 20 placed on its support 10 is lighted with the help of said lighting means 40 arranged on one side of said support 10, and an image CR is captured in said image capture plane, the image CR being an image of the shadow projected by the centering mark of the lens when lighted by the lighting means.

This step may naturally be performed simultaneously with performing the method of determining a refractive characteristic of the lens as described above.

Step k)
The centering and blocking device 100 displays on its display screen 105 (FIG. 7) firstly directly from the acquisition and analysis means the shadows of the ophthalmic lens 20, of the centering and axis-orientation marks CR and CA of the lens 20, and also the shadows 12B, 13B, 14B of the prop elements 12, 13, 14 of the support 10, and secondly a virtual centering target CC corresponding to the desired position for the centering mark CR of the lens for centering relative to a reference point. This reference point is a point associated with the rim of the eyeglass frame.

The display screen 105 also displays a virtual image 200 representative of the corresponding rim of the frame.

Step l)
From the spherical power S of the lens as determined in step i), the processor means 50 deduce a corrected display position for the virtual centering target CC and/or the image of the projected shadow of the centering reference mark CR.

Step m)
The ophthalmic lens is moved so as to cause the corrected position of the shadow of the centering reference mark CR of the lens 20 to coincide on the display screen with the position of the virtual centering target CC.

This step may be performed manually by the user or automatically by manually or automatically controlling means of the centering and blocking device 100 for moving a plate on which the support is placed.

Alternatively, the image processor means 50 act in step i) to determine the position of the optical center of the lens in the image capture plane and to deduce therefrom a blocking position that coincides with or that depends on the optical center. The lens 20 is moved in such a manner that the arm of the centering and blocking device places the gripper block on the lens in this position. The arm is actuated manually or automatically by the centering and blocking device, e.g. as described in document FR 04/12855 (equivalent to U.S. Ser. No. 11/806,746).

By means of the method of the invention, the block is placed more accurately on the lens 20.

The difference between the optical center of the lens and its centering reference mark on the ophthalmic lens 20 generally lies in the range 0 to 6 millimeters.

If the distance LD between the lens and the image capture device 30 (i.e. in this example the translucent screen 31) is equal to 20 millimeters, and if the difference d between the centering mark and the optical center of the lens is equal to 4 millimeters when the image of the centering mark CR is aligned with the virtual centering target CC on the display screen 105, then the centering mark is in fact offset from the location identified by the virtual target CC by a distance:

$$e = D*d*S = 0.08*S$$

Thus, for a lens having spherical power equal to 6 diopters, the image of the centering reference mark CR displayed by the centering and blocking device 100 before correction, and thus of the block placed on the lens by such a device, is shifted through a distance of 0.48 millimeters.

The error induced by the deflection of light rays by the lens 20 on the orientation of the block may in similar manner be as much as an angle of 3 degrees before correction by the centering and blocking device 100.

By using the method of the invention, it is possible to determine the spherical power of the lens to within 0.5 diopters, e.g. as being equal to 5.5 diopters. This makes it possible to correct the centering of the block so as to reduce the error to 0.04 millimeters instead of 0.48 millimeters.

In similar manner, the proposed method also makes it possible to determine the cylinder and the cylinder axis of the lens. It is then possible to correct the error on the orientation of the block relative to the lens that arises because of the deformation of the image due to the cylinder of the lens.

The block is thus positioned much more accurately on the lens.

In addition, this method is particularly inexpensive to perform since it requires no additional optical elements.

The present invention is not limited in any way to the embodiments described and shown, and the person skilled in the art knows how to apply any variant in accordance with its spirit.

In particular, it is possible to envisage that the block has a transparent tip that does not project a shadow on the translucent screen, thereby simplifying the image processing by making substeps e1) to e4) unnecessary. The refractive characteristics can then be determined from the first determined positions of the shadows of the prop elements.

It is possible to provide an arbitrary number of prop elements that is greater than or equal to one, and preferably greater than or equal to three.

The method of the invention is described above in the context of capturing an image in a projected view. It is also possible to use the prop elements of the support to determine the spherical power of the lens in a direct view. Such a direct view configuration is shown in FIG. 8.

A "direct view" configuration is used to mean a configuration in which the lighting means the image capture means are both situated on the same side of the support 10 as is the lens 20.

In this example, the lens 20 is lighted as described above by a parallel light beam coming from the light source 41 situated at the lens focus 42.

An image is taken of the lighted lens via a semireflecting plate 34 through which the light rays from the light 41 pass, but that reflect the light rays reflected by the lens 20 and the support 10.

By way of example, this semireflecting plate 34 is inclined at an angle of 45 degrees relative to the incident light rays from the light means 41, 42.

The light rays reflected by the lens and the support are then sent by the semireflecting plate 34 to the image capture means 30B that comprise, in this example: the digital camera 33, the converging lenses 32, and the semireflecting plate 34. In this example, the converging lens 32 is positioned so as to cause the light rays deflected by the semireflecting plate 34 to converge on the center of the digital camera 33 so that the image picked up by the camera covers the entire ophthalmic lens 20.

The captured image shows the image of each prop element 12, 13, 14 as seen through the lens 20.

Thus, in the method in accordance with the invention, with said lighting means placed on one side of said support:

in step c), an image is captured of the support as lighted by the rays that come from said lighting means and that have passed through said lens and with the help of said image capture means placed on the same side of said support as said lighting means;

in step d), the image of the prop element of the support is identified in said image and at least one characteristic representative of the geometry of the image of said prop element is determined; and in step d), said looked-for refractive characteristic is deduced at least from said characteristic representative of the geometry of the image of said prop element.

In practice, the looked-for refractive characteristic may then be determined in a manner similar to that described above for the projected view configuration, by similar processing of the image of at least one prop element instead of processing the image of the shadow projected by at least one prop element. This processing of the image then makes it possible to identify an outline of the image of at least one prop element.

Thereafter, the position of the geometrical center of the outline is determined and the looked-for refractive characteristic is deduced from the position of the geometrical center of the outline and from a reference position for the geometrical center of the image of the prop element in the absence of a lens.

As before, the reference position of the geometrical center of the image of the prop element in the absence of a lens is determined during a calibration step during which an image of the prop element is captured in the absence of a lens, and is processed in such a manner as to determine the geometrical center of at least one prop element.

In a variant, it is also possible to determine a transverse dimension of the image of the prop element, e.g. the diameter of said image, and to compare it with the corresponding real transverse dimension of the prop element. Since the distance between the lens and the bases of the prop elements is known as is the distance between the image capture device and the lens, this comparison gives access to the magnification of the lens.

The same refractive characteristics can be deduced from these measurements as are determined by performing measurements in a projected view as described above, and in particular it is possible to determine the optical center, the spherical power, the cylindrical power, the orientation of the axis of the power cylinder, the prismatic power, and the orientation of the edge of the power prism.

The invention claimed is:

1. A method of determining at least one refractive characteristic of an ophthalmic lens (20), the method comprising the steps of:

a) placing the lens (20) on a support (10) having at least one prop element (12, 13, 14) in contact with one of the main faces of the lens (20) in a contact zone of area that is small relative to the area of the main faces of said lens (20);

b) lighting the lens (20) placed on its support (10) with the help of lighting means (40); and c) using image capture means (30) to capture an image of the prop element (12, 13, 14) of the support (10) lighted by light rays (R1, R2) that come from said lighting means and that have passed through the lens (20), the image being captured in an image capture plane that is substantially perpendicular to an optical axis (AO) of the lens (20);

the method comprising the following steps:

d) in said image, identifying the image of said prop element (12, 13, 14) of the support (10) and determining at least one characteristic representative of the geometry of the image of said prop element; and e) from said characteristic representative of the geometry of the image of said prop element (12, 13, 14), deducing said looked-for refractive characteristic.

2. A method according to claim 1, wherein the lighting means (40) are arranged on one side of said support (10) and:

in step c), an image is captured of the shadow (12B, 13B, 14B) projected by the prop element (12, 13, 14) of the support (10) as lighted by the light rays (R1, R2) that come from said lighting means and that have passed through the lens (20), the image being captured with the help of said image capture means (30) that are arranged on the side of said support (10) that is opposite from the lighting means (40);

in step d), the shadow (12B, 13B, 14B) projected by said prop element (12, 13, 14) under lighting by the lighting means (40) is identified in said image and at least one characteristic representative of the position of the projected shadow is determined; and in step e), said looked-for refractive characteristic is deduced at least from said characteristic representative of the position of the shadow (12B, 13B, 14B) projected by said prop element (12, 13, 14).

3. A method according to claim 2, wherein said looked-for refractive characteristic is one of the following characteristics: the optical center; the spherical power (S); the cylindrical power and the orientation (a) of the axis of the power cylinder; and the prismatic power (PX, PY) and the orientation of the edge of the power prism.

4. A method according to claim 2, wherein, in step d), the following substeps are performed:
   d1) searching the image (I1) captured in step c) for a partial or total estimated outline (134) of the shadow (12B, 13B, 14B) projected by the prop element (12, 13, 14) of the support (10);
   d2) determining a position of a geometrical center of said estimated outline (134) of the shadow (12B, 13B, 14B) projected by the prop element (12, 13, 14) of the support (10); and
   d3) comparing the position of the geometrical center of the estimated outline (134) as determined in step d2) with a reference position for a geometrical center of the shadow (12A, 13A, 14A) projected by the prop element (12, 13, 14) in the absence of a lens (20), and deducing therefrom the shift (T1, T2, T3) of the shadow (12B, 13B, 14B) projected by the prop element (12, 13, 14) of the support (10) between said reference position and the position determined in step d2);

in step e), the looked-for refractive characteristic is deduced from this shift.

5. A method according to claim 4, wherein, in a preliminary calibration step preceding the performance of step d3), said reference position of the geometrical center of the shadow (12A, 13A, 14A) projected by the prop element (12, 13, 14) is determined by performing the following steps:

lighting said support (10) with the help of said lighting means and in the absence of an ophthalmic lens (20);

capturing an image (I2) of the shadow projected by the support (10) lighted by the light rays from said lighting means (40) with the help of said image capture means (30), the image being captured in said image capture plane, which is substantially perpendicular to the optical axis of the lens (20) when the lens is placed on said support (10); and identifying in said image (I2) the shadow projected by said prop element (12, 13, 14) of the support (10) under lighting by the lighting means (40), and determining the reference position of its geometrical center.

6. A method according to claim 4, wherein, in step e), the following substeps are performed:
   e1) determining a corrected outline (135) of the shadow projected by the prop element (12, 13, 14) of the support (10) from the outline (134) estimated in step d1) by eliminating from the estimated outline (134) a set of points (E) situated around the shift direction as determined in step d3);
   e2) modeling the corrected outline (135) of the shadow (12B, 13B, 14B) projected by the prop element (12, 13, 14) of the support (10) with a model outline;
   e3) determining the position of the geometrical center of the model outline; and
   e4) deducing the looked-for refractive characteristic from the position of the geometrical center of the model outline determined in step e3) and from the reference position of the geometrical center of the shadow (12A, 13A, 14A) projected by the prop element (12, 13, 14) in the absence of a lens (20).

7. A method according to claim 6, wherein said set of points (E) eliminated from the outline estimated in step e1) intercepts an angular sector of angle lying in the range 0 to 180 degrees.

8. A method according to claim 4, wherein:
   in step c), a gray level digital image is captured in which each pixel presents a determined brightness value; and
   in step d1), a binarization step is performed as follows:
      allocating a first brightness value to the pixels of said image that initially presented a brightness value less than a brightness threshold value;
      allocating a second brightness value to the pixels that initially presented a brightness value greater than said threshold brightness value; and then
      searching for the pixels where said brightness value changes from said first value to said second value.

9. A method according to claim 1, wherein said lighting means (40) are located on one side of said support:
   in step c), an image is captured of the support as lighted by light rays from said lighting means that have passed through said lens, the image being captured with the help of said image capture means that are located on the same side of said support as said lighting means;
   in step d), identifying the image of the prop element of the support in said image and determining at least one characteristic representative of the geometry of the image of said prop element; and
   in step e), deducing said looked-for refractive characteristic at least from said characteristic representative of the geometry of the image of said prop element.

10. A method of centering a gripper block on an ophthalmic lens (20), the method comprising the following steps:
   determining the position of the optical center of said lens (20) by the method of claim 1; and
   placing the gripper block on the lens (20) in a position that coincides with or that depends on said optical center.

11. A method of centering an ophthalmic lens (20) relative to a reference mark, the lens including a centering mark for being put into correspondence with said reference mark, the method comprising the following steps:
   i) using the method according to claim 1 to determine the spherical power (S) of the lens (20);
   j) lighting the lens (20) placed on its support (10) with the help of said lighting means located on one side of said support (10), and, in said image capture plane, capturing an image (CR) of the shadow projected by the centering mark of the lens (20) when lighted by the lighting means (40);
   k) displaying on a display screen firstly the shadow of the reference mark (CR) of the lens (20), and secondly a virtual centering target (CC) corresponding to the desired position for the centering mark relative to said reference mark;
   l) from the spherical power of the lens (20) as determined in step i), deducing a corrected display position for the virtual centering target and/or for the image of the shadow projected by the centering mark; and m) moving the ophthalmic lens (20) in such a manner as to cause the corrected position of the shadow of the centering mark of the lens (20) to coincide with the position of the virtual centering target (CC).

12. A device for performing the method according to claim 1, the device comprising:
a support (10) adapted to receive an ophthalmic lens (20), the support having at least one prop element (12, 13, 14) in contact with one of the main faces of the lens (20) in a contact zone of area that is small relative to the area of the main faces of said lens (20);
lighting means (40);
image capture means (30); and
an image processor device (50) adapted to respond to an image captured by said image capture means in a plane substantially perpendicular to an optical axis of the lens (20) to identify the shadow (12B, 13B, 14B) projected by said prop element (12, 13, 14) of the support (10), to determine at least one characteristic representative of the position of the projected shadow, and, from said characteristic representative of the position of the shadow projected by said prop element (12, 13, 14), to deduce said looked-for refractive characteristic.

13. A device according to claim 12, wherein said support (10) is removable.

14. A device according to claim 12, wherein said support (10) includes a transparent stand plate (11) on which the prop element (12, 13, 14) stands, the prop element having at least one portion that is opaque.

15. A device according to claim 12, wherein said prop element (12, 13, 14) comprises a base (121, 131, 141) extended by a tip (122, 132, 142) of width that is smaller than the width of said base.

16. A method according to claim 3, wherein,
in step d), the following substeps are performed:
d1) searching the image (I1) captured in step c) for a partial or total estimated outline (134) of the shadow (12B, 13B, 14B) projected by the prop element (12, 13, 14) of the support (10);
d2) determining a position of a geometrical center of said estimated outline (134) of the shadow (12B, 13B, 14B) projected by the prop element (12, 13, 14) of the support (10); and
d3) comparing the position of the geometrical center of the estimated outline (134) as determined in step d2) with a reference position for a geometrical center of the shadow (12A, 13A, 14A) projected by the prop element (12, 13, 14) in the absence of a lens (20), and deducing therefrom the shift (T1, T2, T3) of the shadow (12B, 13B, 14B) projected by the prop element (12, 13, 14) of the support (10) between said reference position and the position determined in step d2);
in step e), the looked-for refractive characteristic is deduced from this shift.

17. A method according to claim 16, wherein, in a preliminary calibration step preceding the performance of step d3), said reference position of the geometrical center of the shadow (12A, 13A, 14A) projected by the prop element (12, 13, 14) is determined by performing the following steps:
lighting said support (10) with the help of said lighting means and in the absence of an ophthalmic lens (20);
capturing an image (I2) of the shadow projected by the support (10) lighted by the light rays from said lighting means (40) with the help of said image capture means (30), the image being captured in said image capture plane, which is substantially perpendicular to the optical axis of the lens (20) when the lens is placed on said support (10); and
identifying in said image (I2) the shadow projected by said prop element (12, 13, 14) of the support (10) under lighting by the lighting means (40), and determining the reference position of its geometrical center.

18. A method according to claim 5, wherein, in step e), the following substeps are performed:
e1) determining a corrected outline (135) of the shadow projected by the prop element (12, 13, 14) of the support (10) from the outline (134) estimated in step d1) by eliminating from the estimated outline (134) a set of points (E) situated around the shift direction as determined in step d3);
e2) modeling the corrected outline (135) of the shadow (12B, 13B, 14B) projected by the prop element (12, 13, 14) of the support (10) with a model outline;
e3) determining the position of the geometrical center of the model outline; and
e4) deducing the looked-for refractive characteristic from the position of the geometrical center of the model outline determined in step e3) and from the reference position of the geometrical center of the shadow (12A, 13A, 14A) projected by the prop element (12, 13, 14) in the absence of a lens (20).

19. A method according to claim 17, wherein, in step e), the following substeps are performed:
e1) determining a corrected outline (135) of the shadow projected by the prop element (12, 13, 14) of the support (10) from the outline (134) estimated in step d1) by eliminating from the estimated outline (134) a set of points (E) situated around the shift direction as determined in step d3);
e2) modeling the corrected outline (135) of the shadow (12B, 13B, 14B) projected by the prop element (12, 13, 14) of the support (10) with a model outline;
e3) determining the position of the geometrical center of the model outline; and
e4) deducing the looked-for refractive characteristic from the position of the geometrical center of the model outline determined in step e3) and from the reference position of the geometrical center of the shadow (12A, 13A, 14A) projected by the prop element (12, 13, 14) in the absence of a lens (20).

20. A device according to claim 13, wherein said support (10) includes a transparent stand plate (11) on which the prop element (12, 13, 14) stands, the prop element having at least one portion that is opaque.

* * * * *

UNITED STATES PATENT AND TRADEMARK OFFICE
CERTIFICATE OF CORRECTION

| | | Page 1 of 1 |
|---|---|---|
| PATENT NO. | : 9,052,253 B2 | |
| APPLICATION NO. | : 13/884069 | |
| DATED | : June 9, 2015 | |
| INVENTOR(S) | : Stèphane Boutinon | |

It is certified that error appears in the above-identified patent and that said Letters Patent is hereby corrected as shown below:

IN THE SPECIFICATION

Please amend Column 14, lines 32-41 to read as follows:

--The image processor means 50 can then also determine the coordinates (XCO, YCO) of the optical center of the lens 20 as the coordinates of the points through which the light rays are not deflected, using the following relationships:

*XCO = -{PX+C\*sin(2\*a)\*YCO}/{S+C\*cos(2\*a)}* and

*YCO = {(C\*sin(2\*a)\*PX-PY\*(S+C\*cos(2\*a))}/*

*{(S-C\*cos(2\*a))\*(S+C\*cos(2\*a))-(C\*sin(2\*a))2}*--

Signed and Sealed this
Eighth Day of December, 2015

Michelle K. Lee
*Director of the United States Patent and Trademark Office*